United States Patent [19]

Mizoguchi et al.

[11] Patent Number: 5,648,151

[45] Date of Patent: Jul. 15, 1997

[54] POROUS POLYURETHANE SHEET

[75] Inventors: Akinobu Mizoguchi, Kurashiki; Shinji Nakanishi, Okayama; Toshiyuki Akasawa, Kurashiki, all of Japan

[73] Assignee: Kuraray Co., Ltd., Kurashiki, Japan

[21] Appl. No.: 408,288

[22] Filed: Mar. 22, 1995

[30] Foreign Application Priority Data

Mar. 22, 1994 [JP] Japan .................................. 6-050524

[51] Int. Cl.⁶ .................................................. B32B 27/40
[52] U.S. Cl. .................. 428/220; 428/315.9; 428/317.9; 428/318.4; 428/319.9; 442/63
[58] Field of Search ............................... 528/83; 428/220, 428/245, 253, 254, 255, 260, 261, 262, 265, 267, 270, 272, 273, 274, 315.9, 317.9, 318.4–319.9

[56] References Cited

U.S. PATENT DOCUMENTS

| | | | |
|---|---|---|---|
| 3,908,060 | 9/1975 | Okazaki et al. | 428/246 |
| 4,746,684 | 5/1988 | Kuriyama et al. | 521/137 |
| 5,156,900 | 10/1992 | Nishimura | 428/151 |
| 5,520,998 | 5/1996 | Uemoto et al. | 428/241 |

FOREIGN PATENT DOCUMENTS

| | | |
|---|---|---|
| 0 619 332 | 10/1994 | European Pat. Off. . |
| 24 31 846 | 1/1976 | Germany . |
| 48-29397 | 9/1973 | Japan . |
| 59-10378 | 3/1984 | Japan . |
| 59-10380 | 3/1984 | Japan . |
| 2-160820 | 6/1990 | Japan . |
| 3-14949 | 2/1991 | Japan . |
| 3-244619 | 10/1991 | Japan . |

OTHER PUBLICATIONS

Patent Abstracts of Japan, vol. 14, No. 423 (C–0757), Sep. 12, 1990, JP-A-2 160 820.
Database WPI, Derwent Publications, AN 93–364973, JP-A-05 270 870, Oct. 19, 1993.
Patent Abstracts of Japan, vol. 14, No. 261 (C–0725), Jun. 6, 1990, JP-A-02 074678, Mar. 14, 1990.

*Primary Examiner*—Ana Woodward
*Attorney, Agent, or Firm*—Oblon, Spivak, McClelland, Maier & Neustadt, P.C.

[57] ABSTRACT

A porous sheet is obtained by wet coagulating a polyurethane comprising a soft segment component of repeating units from a polycarbonate, those from a diethylene glycol-based polyester and those from a tetramethylene glycol-based polyester and a hard segment component of an aromatic diisocyanate and ethylene glycol. The polyurethane has excellent processability such as wet coagulatability and the obtained porous sheet has good durability and flexibility, in particular flexibility at low temperatures and is well usable for leather-like sheets.

2 Claims, No Drawings

POROUS POLYURETHANE SHEET

BACKGROUND OF THE INVENTION

1. Field of the Invention

The present invention relates to a porous sheet having a good hand and excellent durability.

More specifically, the present invention relates to a porous sheet obtained from a polyurethane having a specific chain structure and having excellent mechanical properties and durability. The porous sheet has excellent wet coagulatability upon its production and also excellent processability such as embossability upon embossing, and is suited for producing leather-like sheets.

2. Description of the Prior Art

A well known process for producing porous sheet is as follows: A solution of a polymer, principally comprising polyurethane resin, is applied on a support, such as a film or a fibrous structure such as nonwoven fabric, which is impregnated or coated with this solution. The obtained body is then immersed in a solution which is a non-solvent for the resin and miscible with the solvent of the resin solution, to coagulate, i.e. wet coagulation of the resin, whereby a porous sheet is obtained.

Porous sheets as obtained by the above process are, by being patched onto the surface of a fabric or, when it is integrated with a fibrous structure, used as it is, as leather-like sheets.

Porous sheets usable for leather-like sheets are required to maintain their strength without degradation upon long-periods of storage or use, i.e. required to be highly durable, flexible, in particular at low temperatures and to have a surface resembling that of natural leather, i.e. an excellent hand. To obtain this type of flexible, porous sheets having an excellent hand, it is necessary that a sufficiently porous state be achieved by wet coagulation (good wet coagulatability) and that, upon provision of the surface of greige porous sheet with a roughened surface structure by embossing, the desired surface morphology be given and, at the same time, the porous state not be damaged to a large extent (i.e., good embossability).

In general, a polyurethane is synthesized from a polymer diol such as a polyester diol, a polyether diol or a polycarbonate diol, a diisocyanate and a chain extender. With the obtained polyurethane, the component derived from the polymer diol is called the soft segment component and that from the diisocyanate and chain extender is called the hard segment component. The hard segments and soft segments are present alternately, to constitute the polyurethane. The soft segments give elasticity to the polymer, while the hard segments provide the strength and prevent plastic flow.

Japanese Patent Publications 10380/1984 and 10378/1984 describe a polyurethane, where the soft segment component is a polycarbonate diol, where the polyurethane has a good durability but poor wet coagulatability. The publications propose, to improve the above, by mixing two types of polyurethanes having nitrogen atoms contained in the isocyanate groups in different amounts by at least 0.2%, or by mixing at least two types of polyurethanes with polycarbonate diols having different molecular weights by at least 100. However, the resulting polyurethanes are only slightly, if ever, improved in the wet coagulatability and cannot give porous sheets having a good porous state.

Japanese Patent Application Laid-open No. 160820/1990 describes that a polyurethane resin composition, obtained by using as at least one diol component of a polycarbonate diol obtained from an aliphatic and/or alicyclic hydrocarbon diol has excellent mechanical properties and resistance to hydrolysis. However, the application gives no description of wet coagulating this polyurethane. In producing a natural leather-like sheet, the usual process comprises using, to provide the leather-like sheet with good flexibility, a nonwoven fabric comprising fibers from a plurality of polymers as a substrate layer and, after applying polyurethane to the substrate layer, extracting off with toluene, at least one of the polymers constituting the fibers. The polyurethane resin described in this application can, when wet coagulated and extracted with toluene, never give a porous sheet having a good porous state and smooth surface.

Japanese Patent Publication No. 29397/1973 describes that a polyurethane synthesized from a polyester diol, obtained from a mixed diol containing dipropylene glycol is good in both wet coagulatability and resistance to hydrolysis. However, the polyurethane from the dipropylene glycol-based polyester diol has poor durability. The publication further describes that: while polyurethanes using a polyester diol such as polyneopentyl adipate, polyhexene adipate, polybutylene sebacate, polyhexene neopentyladipate or polyhexene sebacate have good resistance to hydrolysis, they have poor wet coagulatability; and while polyurethanes using a polyester diol such as polyethylene adipate, polybutylene adipate or polydiethylene adipate have good wet coagulatability, they have poor resistance to hydrolysis, i.e. poor durability.

Japanese Patent Publication No. 14949/1991 discloses a fibrous material impregnated with a polycarbonate-based polyurethane and forming a microporous body by wet coagulation treatment. However, the microporous body obtained by this process can never be said to be of a good porous state. In fact, the process of the publication does not use the porous sheet obtained by wet coagulating the above polycarbonate-based polyurethane as a surface layer for which a good microporous state is required.

Japanese Patent Application Laid-open No. 244619/1991 discloses a process for producing a polyurethane resin which comprises reacting a polycarbonate polyol, an alicyclic polyisocyanate and an aromatic polyisocyanate. The application describes that, in particular, a combination of a polycarbonate polyol of polyhexamethylene carbonate diol, a alicyclic polyisocyanate of dicyclohexylmethane diisocyanate and an aromatic polyisocyanate of diphenylmethane diisocyanate gives a polyurethane having excellent mechanical properties, resistance to hydrolysis, light resistance and sweat resistance. However, the polyurethane obtained by the process has, same as the above, poor wet coagulatability and gives, on wet coagulation, a sheet having no microporous state, which is never flexible.

As stated heretofore, although use of a specific polyester diol such as polyethylene adipate diol as a soft segment component achieves good wet coagulatability, thereby giving a smooth surface, the obtained polyurethane has poor durability; and use of a polycarbonate diol or polyether diol as a soft segment component results in poor processability including wet coagulatability, thereby being inapplicable to the technical field of producing porous sheets. Furthermore, if conventional techniques can give good, flexible porous sheets at all, these sheets suffer deterioration in flexibility under low temperature conditions. Besides, these sheets are not quite satisfactory in processability such as embossability upon embossing treatment.

Accordingly, there remains a need for a porous sheet having good wet coagulatability and embossability, as well as excellent durability and flexibility, especially at low temperatures.

SUMMARY OF THE INVENTION

Accordingly, an object of the present invention is to provide a porous sheet having good wet coagulatability and embossability, as well as excellent durability and flexibility, in particular that at low temperatures.

The present invention provides a porous sheet comprising a polyurethane which comprises:

a) a soft segment component containing in the same or different soft segments repeating units represented by formula (I), formula (II) and formula (III),

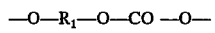
$$—O—R_1—O—CO—O— \quad (I)$$

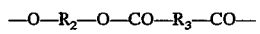
$$—O—R_2—O—CO—R_3—CO— \quad (II)$$

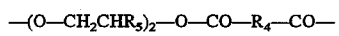
$$—(O—CH_2CHR_5)_2—O—CO—R_4—CO— \quad (III)$$

wherein $R_1$ represents a hydrocarbon group having 5 to 6 carbon atoms, $R_2$ represents a tetramethylene group, $R_3$ and $R_4$, which may be the same or different, each represents an alkylene group having 4 to 8 carbon atoms and $R_5$ represents a hydrogen atom or methyl group, the ratio between the number of repeating units (I), (II) and (III) and the total number of repeating units (I), (II) and (III) are 0.1 to 0.8, 0.05 to 0.7 and 0.05 to 0.8, respectively; and b) a hard segment component having an aromatic diisocyanate component and ethylene glycol or 1,4-butanediol component.

The present invention also provides a process for producing porous sheets which comprises applying a solution of the above polyurethane on a supporting surface and wet coagulating the solution to obtain a porous sheet, followed by peeling off the porous sheet from the supporting surface.

The present invention further provides a process for producing porous sheets which comprises impregnating and/or coating a fibrous structure with a solution of the above polyurethane and wet coagulating the solution.

The porous sheet of the present invention, having the above constitution and thus achieving the above object, produces far better effects than those expected by simply calculating the arithmetical mean properties of a porous sheet obtained by wet coagulating different polyurethanes having repeating units of formula (I), (II) and (III), respectively. In addition, the porous sheet of the present invention has an unexpectedly good flexibility at low temperatures and embossability, which cannot be expected from known facts. That is, while mixing a polyurethane having good durability but poor wet coagulatability and another one having good wet coagulatability but poor durability gives, in general, a polyurethane having a durability and wet coagulatability just between the two raw polyurethanes, the polyurethane of the present invention has far better properties as compared with those average properties expected. This is considered to be due to interaction of the above three repeating units of (I), (II) and (III) with each other, which prevents the properties from being deteriorated as expected by conventional mixing.

DETAILED DESCRIPTION OF THE PREFERRED EMBODIMENTS

Examples of the repeating units represented by the above formula (I) are those obtained by linking 1,6-hexanediol, 3-methyl-1,5-pentanediol and 1,5-pentanediol by a carbonate bond, i.e. polyhexamethylene carbonate diol, polymethylpentane carbonate diol and polypentamethylene carbonate diol. Among these, repeating units of 1,6-hexanediol linked by carbonate bond is preferred.

Polymer diols having repeating units represented by formula (I) can be obtained by, for example, reacting 1,6-hexanediol, 3-methyl-1,5-pentanediol or 1,5-pentanediol with a diaryl carbonate or dialkyl carbonate under reduced pressure, or reacting 1,6-hexanediol, 3-methyl-1,5-pentanediol or 1,5-pentanediol with a cyclic alkylene carbonate under reduced pressure. Examples of the above diaryl carbonate, dialkyl carbonate and cyclic alkylene carbonate are diphenyl carbonate, dimethyl carbonate and ethylene carbonate, respectively.

If the group represented by $R_1$ is not a hydrocarbon having 5 to 6 carbon atoms, the object of the present invention cannot be achieved. For example, nonamethylene group gives insufficient coagulatability, thereby giving, after wet coagulation, no smooth porous sheet.

Examples of the unit represented by formula (II) are tetramethylene adipate and tetramethylene sebacate, of which the former is preferred. These repeating units can be obtained by polycondensing tetramethylene glycol and adipic acid or sebacic acid. With repeating units represented by formula (II), if $R_2$ is not tetramethylene group, the flexibility at low temperatures or smooth-surface porous sheet cannot be obtained. Likewise, if the group represented by $R_3$ is not an alkylene group having 4 to 8 carbon atoms, the same drawbacks will appear.

Examples of the unit represented by formula (III) are diethylene adipate, dipropylene adipate, diethylene sebacate and dipropylene sebacate, among which the former two are preferred. These repeating units can be obtained by polycondensing diethylene glycol and adipic acid or sebacic acid, or dipropylene glycol and adipic acid or sebacic acid. On this occasion, diethylene glycol and dipropylene glycol may, naturally, be mixed. With the unit of formula (III), absence of the group represented by $—(O—CH_2CHR_5)_2—O—$ cannot give a smooth surface porous sheet. Likewise, if the group represented by $R_4$ is not an alkylene group having 4 to 8 carbon atoms, no smooth-surface porous sheet can be obtained.

Three representative processes are available for producing the polyurethane used in the invention, as follows.

(1) synthesizing a polymer diol containing in the same molecule the repeating units of formulas (I), (II) and (III) and then reacting the obtained polymer diol with a diisocyanate and a chain extender;

(2) mixing three polymer diols each having in the molecule thereof the repeating units represented by formulas (I), (II) and (III), respectively, and reacting the obtained mixed diol with a diisocyanate and a chain extender; and (3) mixing a first polyurethane obtained by reacting a polymer diol comprising repeating units represented by formula (I) with a polymer diol, a diisocyanate and a chain extender, a second one obtained by reacting a polymer diol comprising repeating units represented by formula (II) with a polymer diol, a diisocyanate and a chain extender and a third one obtained by reacting a polymer diol comprising repeating units represented by formula (III) with a polymer diol, a diisocyanate and a chain extender.

Among the above processes, the process (1) is preferred. Particularly preferred is one which comprises reacting a polymer diol containing in the same molecule the repeating units of formulas (I), (II) and (III) and further the repeating units represented by the following formulas (IV) and (V)

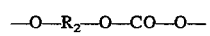
$$—O—R_2—O—CO—O— \quad (IV)$$

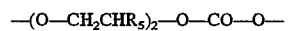
$$—(O—CH_2CHR_5)_2—O—CO—O— \quad (V)$$

wherein $R_2$ and $R_5$ are as defined above, and then reacting the obtained polymer diol with a diisocyanate and a chain extender.

In the above case, it is desirable that the ratio of $[(IV)+(V)]/[(II)+(III)+(IV)+(V)]$ be in a range of 0.05 to 0.8, particularly in a range of 0.1 to 0.6.

In the present invention, there may be employed processes other than the above (1) through (3), for example a combination of the above (1) and (2), such as one which comprises mixing a polymer diol having in the same molecule, two groups of repeating units represented by formulas (II) and (III) respectively, and another polymer diol having repeating units of formula (I) and then reacting the obtained mixed diol with a diisocyanate and a chain extender.

In particular, it is desirable to use the above process (1), which assures large interactive effects of formulas (I), (II) and (III). Coming next is the above combination of processes (1) and (2), followed by process (2) alone. With the process (1), the repeating units of formula (I), (II) and (III) are present in the same soft segment. With the process (2), while only one of the repeating units of formula (I), (II) and (III) is present in the same soft segment, these three types of repeating units are present, generally, in the same polyurethane molecule. With the process (3), only one of the repeating units of formula (I), (II) and (III) is present in the same polyurethane molecule.

The polyurethane used in the present invention includes simple mixtures of at least two polyurethanes as obtained by the above process (3).

In the present invention, it is necessary that the ratio between the numbers of repeating units of formula (I), (II) and (III) and the total number of units represented by (I), (II) and (III) [hereinafter these ratios are referred to as $(I)/\{(I)+(II)+(III)\}$, $(II)/\{(I)+(II)+(III)\}$ and $(III)/\{(I)+(II)+(III)\}$, respectively] be 0.1 to 0.8, 0.05 to 0.7 and 0.05 to 0.8, respectively. The term "the ratio between the number of repeating units and the total number of repeating units" herein means, where each of the repeating units of formulas (I), (II) and (III) is deemed as one molecule, the ratio between the numbers of the molecules of formulas (I), (II) and (III) and the total number of the molecules of (I), (II) and (III).

If the ratio of the repeating units of formula (I) i.e. $(I)/\{(I)+(II)+(III)\}$, is less than 0.1, a porous sheet having good durability cannot be obtained. On the other hand, if the ratio exceeds 0.8, a flexible, smooth-surface porous sheet having a good porous state cannot be obtained and the obtained sheet will have poor embossability. The ratio $(I)/\{(I)+(II)+(III)\}$ is preferably 0.2 to 0.7, more preferably 0.25 to 0.6.

If the ratio of the repeating units of formula (II) i.e. $(II)/\{(I)+(II)+(III)\}$, is less than 0.05, the resulting porous sheet will have poor porous state and have a roughened surface. On the other hand, if the ratio exceeds 0.7, the resulting porous sheet will have poor durability or poor flexibility at low temperatures. The ratio is preferably 0.07 to 0.65, more preferably 0.1 to 0.6.

The ratio of the repeating unit of formula (III), i.e. $(III)/\{(I)+(II)+(III)\}$, should be in a range of 0.05 to 0.8 as described above. If the ratio is less than 0.05, the resulting porous sheet will have poor flexibility at low temperatures. The porous sheet of the present invention is, as described before, used as a substrate layer or surface layer of leather-like sheets. If such leather-like sheets, which are to be processed into shoes and bags, have poor flexibility at low temperatures, the obtained shoes will not be good to put on at low temperatures or, in some cases, the constituting porous sheet will create splits or cracks. On the other hand, if the ratio exceeds 0.8, the resulting porous sheet will have poor durability. The ratio is preferably 0.07 to 0.7, more preferably 0.1 to 0.6.

With the process (1), where the polymer diol has copolymerization components of (I), (II) and (III), the three groups of repeating units (I), (II) and (III) undergo exchange reaction on synthesis of the polymer diol, the ratio between (I), (II) and (III) present in the obtained polymer diol sometimes differs from that between (I), (II) and (III) used as starting materials. It becomes therefore important to subject the obtained polymer diol to NMR analysis to determine the ratio between (I), (II) and (III) contained therein. This exchange reaction will produce the above-described repeating units (IV) and (V). The degree of the exchange reaction can be changed by adjusting the temperature and time of the synthesis. On the other hand, substantially no exchange reaction occurs with the process (2) or (3), where different polymer diols are mixed on or after synthesis of polyurethane, whereby the ratio between (I), (II) and (III) present in the starting polymer diols is nearly the same as in the obtained polyurethane.

It is desirable that the polymer diol having in the same or different molecules thereof the repeating units of the formulas (I), (II) and (III) for the polyurethane used in the present invention have a number average molecular weight (Mn) of 700 to 4,000, more preferably 1,000 to 2,500. With the molecular weight (Mn) being less than 700, the resulting polyurethane, when used for a leather-like sheet, tends to give poor hand. With the molecular weight (Mn) exceeding 4,000, which necessarily reduces the urethane group concentration, it is difficult to obtain a porous sheet having well-balanced properties of hand, flexibility, cold resistance, heat resistance and durability. Moreover, such a polymer diol itself will be difficult to produce on an industrial scale.

While the polyurethane used in the present invention contains as soft segments the repeating units of the above formula (I), (II) and (III), conventional polymer diols containing no repeating units of (I), (II) or (III) may also be incorporated and used in combination within limits not to impair the purpose of the present invention. Examples of such polymer diols are polyester diols, polyether diols, polylactone diols and polycarbonate diols. Further the above-described polymer diol having at least one of the repeating units of (I), (II) and (III) may contain repeating units other than (I), (II) and (III) within limits not to impair the invention. Examples of these other repeating units are polyester units, polyether units, polycarbonate units and polylactone units, that are other than (I), (II) and (III).

The diisocyanate used in the present invention is an aromatic diisocyanate, preferably a $C_{6-20}$ aromatic diisocyanate, as described before and as examples are dipheneylmethane-4,4'-diisocyanate, 2,4-or 2,6-tolylene diisocyanate, meta- or para-phenylene diisocyanate and 1,5-naphthylene diisocyanate. Among these, diphenylmethane-4,4'-diisocyanate is particularly preferred in view of processability and the surface smoothness, hand and durability of the resulting porous sheet. A diisocyanate of aliphatic or alicyclic compound is insufficient in wet coagulatability and stability of pores upon toluene extraction, thereby being incapable of giving a smooth porous sheet. Naturally, diisocyanates other than aromatic ones may be used in combination within limits not to impair the purpose of the present invention.

While there is no particular limitation as to the amount of the diisocyanate used, it is generally desirable that the ratio between the NCO group equivalents and the total equivalents of the terminal hydroxyl groups of the polymer diol used and the hydroxyl groups of ethylene glycol or butylene glycol used as the chain extender (NCO/OH) be 0.95 to 1.2, more preferably 0.97 to 1.1.

As the chain extender, ethylene glycol or 1,4-butanediol is used in view of stability upon toluene extraction. Other chain extenders, e.g. low molecular diols such as propylene glycol and 1,5-pentanediol and low molecular diamines, such as ethylenediamine and hexamethylenediamine cannot achieve the object of the present invention. However, such low molecular diols other than ethylene glycol and 1,4-butanediol may be used in combination within limits not to impair the purpose of the present invention.

Although there is no specific limitation to the amount of the chain extender used, it is desirable that, as described above, the amount be such that the (NCO/OH) ratio will fall within the range of 0.95 to 1.2 and further that the ratio between the hydroxyl groups of the chain extender and the terminal hydroxyl groups of the polymer diol used will be in a range of 1 to 7 in view of flexibility and wet coagulatability.

The polyurethane can be polymerized by any conventional polymerization processes including melt polymerization, solution polymerization and bulk polymerization. However, since the obtained polyurethane is used in the form of solution upon manufacture of porous sheets, it is desirable to conduct solution polymerization in view of solubility in the solvent. During polymerization, a catalyst is not necessary, but it is possible to use one of the usual catalysts for polyurethane production, e.g. metal compounds such as titanium tetraisopropoxide, dibutyltin dilaurate and tin octate and tertiary amines such as tetramethylbutanediamine and 1,4-diaza[2,2,2]bicyclooctane.

Any solvent for conventional polyurethanes can be used for the obtained polyurethane or for the above solution polymerization. Examples of these solvents are dimethylformamide, dimethylacetamide, N-methylpyrrolidone, toluene, ethyl acetate, methyl ethyl ketone and tetrahydrofuran. Among the above, dimethylformamide is preferred because it can be used to form flexible porous sheets having good porous state. The polyurethane solution preferably has a polyurethane concentration of 5 to 50% by weight.

The polyurethane obtained by the above process can, upon use, incorporate various additives generally used for conventional polyurethanes, e.g. flame retardants such as phosphorus compounds and halogen-containing compounds, antioxidants, UV absorbers, pigments, plasticizers and surfactants.

The polyurethane solution thus prepared is processed into porous sheet, by applying the polyurethane solution onto a release paper or by having a fibrous substrate impregnated or coated therewith, and then coagulating. Wet coagulation is preferably conducted on this occasion because the polyurethane of the present invention has good wet coagulatability. Any wet coagulating process can be applied here. For example, a polyurethane solution having a concentration of 10 to 30% by weight is thrown into an aqueous solution of a solvent for the polyurethane having a mixing ratio between the solvent and water of 55/45 to 0/100 at a temperature of 20° to 55° C.

Any conventional fiber can be used as the fibrous structure to be impregnated and/or coated with the polyurethane solution. Examples of the fibers are natural fibers, such as cotton, hemp and wool, regenerated or semi-synthetic fibers such as rayon and acetate and synthetic fibers such as polyester fibers, polyamide fibers, acrylic fibers and polyvinyl alcohol fiber. With respect to synthetic fibers, polymer-blend spun fibers and composite spun fibers may also be used, to say nothing of homofil fibers.

Where polymer-blend spun fibers or composite fibers are used, it is desirable to remove by extraction or decomposition, at any stage during manufacture of porous sheets, at least one of a plurality of the polymers constituting the fibers. The removal makes flexible the fibrous structure, which then provides the porous sheets therefrom with a flexible, high-quality feeling. In particular, where such removal by extraction or decomposition makes bundles of ultrafine fibers having an average fineness of 0.0005 to 0.3 denier, if a leather-like sheet therefrom is permitted to have a napped surface, i.e. to be what is known as suede-tone leather-like sheet, the sheet will have raised ultrafine fibers on the surface, thus achieving a high-quality feeling. Likewise, the above bundles of ultrafine fibers can, when processed into a leather-like sheet having a coated layer on the surface, i.e. what is known as a grain layer, the sheet will have excellent surface smoothness and high-quality feeling.

This type of ultrafine fiber-generating fibers can be obtained by polymer-blend spinning or composite spinning a ultrafine fiber component and a component removable by extraction or decomposition (hereinafter extraction removal and decomposition removal are both simply referred to as "extraction removal"). Examples of ultrafine fiber component are polyesters such as polyethylene terephthalate and polybutylene terephthalate, polyamides such as 6-nylon and 6,6-nylon and polyolefins such as polypropylene.

Examples of extraction removable component are polyethylene, polypropylene, ethylene-propylene copolymer, ethylene-vinyl acetate copolymer, ethylene-acrylic acid ester copolymer, ethylene-$\alpha$-olefin copolymers, polystyrene, styrene-isoprene copolymer, hydrogenated products of styrene-isoprene copolymers, styrene-butadiene copolymer, hydrogenated products of styrene-butadiene copolymer and polyurethanes.

With respect to the ultrafine fiber-forming polymer and extraction removable polymer used for producing ultrafine fiber-generating fibers, it is desirable that the latter have a higher solubility or decomposability for the solvent or decomposing agent than the former, that both polymers have low affinity with each other and that the latter have lower melt viscosity than the former under the spinning conditions employed. The resulting ultrafine fibers preferably have an average fineness of 0.00005 to 1 denier, more preferably 0.0005 to 0.3 denier.

The ultrafine fiber-generating fibers may be produced by any process with no specific limitation. There are, for example, available a process which comprises blending a ultrafine fiber-forming polymer and an extraction removable polymer in a prescribed ratio, melting the blend in the same melting system to form a blended flow and then spinning the flow; a process which comprises melting the two polymers in separate melting systems, subjecting the two melts to repeated joining and separation several times along the spinning head part to form a blended flow and then spinning the flow; and a process which comprises melting the two polymers in separate melting systems, joining the two melts at the spinneret part and spinning the joined flow. Since the two polymers are incompatible with each other, they become present in the resulting fiber cross-section separately, in the form of islands-in-the-sea (where ultrafine fiber component forms islands) or multilayer laminate. It is particularly preferred that the ultrafine fiber-forming polymer occupy 40 to 80% by weight of the extruded fibers and that the number of ultrafine fiber-forming units in the cross-section of the extruded fibers be at least 5, preferably in a range of 50 to 800. The ultrafine fiber-forming fibers thus spun are, as required, then subjected to the usual-treating processes such as drawing and heat setting, to be processable fibers.

It is also possible to produce another type of islands-in-the-sea fibers where the sea and islands are reversely present, i.e. where the extraction removable polymer constitutes the islands component, and extract the islands component to obtain lotus-root-like multi-pore hollow fibers. This type of fibers can also give a leather-like sheet having a good flexibility resembling natural leather.

As the fibrous structure used in the invention, woven, knit or nonwoven fabrics are applicable. Among these, nonwoven fabrics, in particular 3-dimensionally entangled nonwoven fabrics are suitably used, because when they are napped, the napped surfaces become even, and when covered with a coating layer the surfaces of the resulting layer become smooth. These nonwoven fabrics may, as necessary, contain therein knit or woven fabrics for reinforcement or like purposes.

When a nonwoven fabric is used as the fibrous structure, the nonwoven fabric can be obtained by, for example, opening the above fibers by carding, forming a random or crosslapped web through a webber, laminating the obtained web one on another to the desired weight and thickness and then subjecting the laminated web to fiber entangling treatment by needle-punching, water jetting, air jetting or the like.

The fibrous structure is then impregnated and/or coated with the polyurethane solution which has been obtained in the above manner and to which a coagulation adjusting agent, release agent, plasticizer, stabilizer, antioxidant, light resistant agent, color and like additives have been, as necessary, added, and subjected to wet coagulation.

With the fibrous structure being a nonwoven fabric formed of ultrafine fiber-generating fibers or lotus-root-type fiber-generating fibers, the extraction removable component constituting the fibers is, prior to or after impregnation and/or coating of the polyurethane solution, extraction removed, to produce bundles of ultrafine fibers or lotus-root-like multi-pore hollow fibers.

Although the amount of the polyurethane to be contained in the resulting sheet containing a fibrous structure and the polyurethane is not specifically limited, it is preferably in a range of 10 to 60% by weight, more preferably in a range of 15 to 45% by weight for the purpose of obtaining a leather-like sheet. If the amount of polyurethane is too small, the obtained sheet will have poor hand without KOSHI (stiffness), which becomes more marked with the amount being less than 10% by weight. If the amount of polyurethane is too large, the resulting sheet will tend to become rigid or poor hand with no bulk, which tendency becomes more marked when the amount exceeds 60% by weight.

The fibrous structure impregnated with the polyurethane and coagulated may then, as necessary, be provided on the surface thereof with a porous layer and thereafter with a non-porous coating layer. Alternatively, a fibrous structure having been impregnated and coated with the polyurethane solution and coagulated may be, as required, provided with a nonporous coating layer. Both are then embossed to give a surface pattern resembling that of natural leather, to become leather-like sheets with a grain surface.

Besides the above process of direct impregnation and/or coating of a fibrous structure with the polyurethane solution, the porous sheet of the present invention may also be obtained as follows. The polyurethane solution is applied on a supporting sheet such as polyethylene sheet and wet coagulated, to give a porous sheet. The porous sheet is peeled off from the supporting surface and patched on a fibrous structure. The surface of the thus patched porous sheet is embossed to give a surface pattern resembling that of natural leather, whereby a leather-like sheet with a grain surface.

The above fibrous structure having been impregnated with the polyurethane and coagulated may also be subjected to napping treatment on at least one surface thereof, to give a leather-like sheet with napped suede-like tone. It is also possible to slice the sheet to any optional thickness in the thickness direction at any state of the sheet production.

With the porous sheet of the present invention being obtained by impregnating a fibrous structure with the polyurethane, followed by coagulating, the porous sheet preferably has a thickness after slicing of 0.2 to 3 mm.

With the porous sheet being obtained by applying the polyurethane on a fibrous structure, followed by coagulation, or by coagulating the polyurethane on a supporting surface, the resulting sheet preferably has a thickness of 0.05 to 0.5 mm and a density of 0.3 to 0.5 g/cm$^3$.

The wet coagulatability of a polyurethane can, for example, be evaluated as follows. A 10–30% by weight solution of a polyurethane sample is applied on a release substrate such as polyethylene sheet and wet coagulated. The obtained polyurethane coating layer is peeled off from the substrate, to give a porous sheet. The sheet is then evaluated for the surface smoothness, the ratio between the thickness of the sheet after coagulation and that of the polyurethane solution applied (hereinafter this ratio is referred to as "thickness retention") and the uniformity of pores observable on the cross-section of the porous sheet. These surface smoothness, thickness retention and uniformity of pores will vary depending on the concentration of the polyurethane solution and the temperature and concentration of the coagulating bath used. However, those polyurethanes having a thickness retention of 40 to 70% and a good surface smoothness and uniformity of pores under the same condition are judged to have good coagulatability. In other words, less coagulatable polyurethanes tend to have poorer surface smoothness due to marked shrinkage upon coagulation or uneven coagulation progressing and form pores having nonuniform sizes and distribution.

The porous sheets of the present invention thus obtained, having excellent wet coagulatability and embossability, can suitably used as resins to impregnate or coat substrate layers for leather-like sheets. The resulting leather-like sheets, having excellent durability, flexibility, in particular that at low temperatures, surface smoothness and hand, are suitably usable for clothing, shoes, bags, household furniture, car interior materials, various household goods and like items. These excellent characteristics can only be achieved by the use of polyurethanes having a specific structure.

Other features of the invention will become more apparent in the course of the following description of exemplary embodiments which are given for illustration of the invention and are not intended to be limiting thereof.

EXAMPLE 1

A reaction vessel was charged with 400 parts by weight of a polyhexamethylene carbonate diol having a molecular weight (Mn) of 2,000 as the repeating units represented by formula (I), 200 parts by weight of a polydiethylene adipate diol having a molecular weight (Mn) of 2,000 as the repeating units represented by formula (III), 400 parts by weight of a polytetramethylene adipate diol having a molecular weight (Mn) of 2,000 as the repeating units represented by formula (II), 124.1 parts by weight of ethylene glycol as a chain extender, 638.2 parts by weight of diphenylmethane-4,4'-diisocyanate as a diisocyanate and 5,290 parts by weight of dimethylformamide (hereinafter abbreviated as "DMF") as a reaction solvent. The mixture was reacted under a nitrogen flow, to give a polyurethane solution (A) having a solid concentration of 25% and a viscosity of 413 poises (30° C.), and ratios of (I)/{(I)+(II)+(III)}, (II)/{(I)+(II)+(III)} and (III)/{(I)+(II)+(III)} of 0.49, 0.35 and 0.16, respectively.

The following polyurethane composition liquids (A-1) and (A-2) were prepared by using the obtained polyurethane solution (A).

|  | Parts by weight |
| --- | --- |
| Polyurethane composition liquid (A-1) | |
| Polyurethane solution (A) | 720 |
| Sorbitan monostearate | 10.8 |
| Stearyl alcohol | 5.4 |
| Black pigment | 2.0 |
| DMF | 261.8 |
| Total | 1,000.0 |
| Polyurethane composition liquid (A-2) | |
| Polyurethane solution (A) | 480 |
| Crison Assistor-SD-14 | 5 |
| (Trademark of Dainippon Ink & Chemicals Inc., coagulation adjusting agent) | |
| Black pigment | 2 |
| DMF | 513 |
| Total | 1,000 |

A 3-dimensionally entangled nonwoven fabric having a weight of 400 g/m² and a thickness of 2.5 mm and formed of 3-denier polymer-blend spun fibers comprising nylon-6/polystyrene (weight ratio: 45/55, polystyrene: islands component) was impregnated with an aqueous polyvinyl alcohol solution, dried, press-fixed to a thickness of 2.1 mm and subjected to surface-buffing, into a processed nonwoven fabric having a thickness of 1.7 to 1.8 mm. The obtained nonwoven fabric was impregnated with 4.4 times the nonwoven weight of the polyurethane composition liquid (A-1) and the surface was made smooth. Next, the polyurethane composition liquid (A-2) was applied on the surface in an amount of 80 g/m² and then the nonwoven fabric with the liquids were immersed in a 40% by weight aqueous DMF solution at 45° C. for 30 minutes, to coagulate both impregnated layer and coating layer.

The obtained sheet was immersed in hot water at 50° to 60° C. for about 2 hours, to wash off the solvent (removing DMF) sufficiently, and then subjected to repeated immersion in 80° C.-hot water and squeezing 6 times, to dissolve off the polyvinyl alcohol used for fixing the nonwoven fabric. The sheet was hot air dried at 80° C. and the back surface was sliced off to a thickness of remaining part of 1.5 to 1.6 mm. The sheet was immersed in toluene at 80° C. and the polystyrene present in the nylon-6/polystyrene polymer-blend spun fibers used for the raw nonwoven fabric was extracted off, to change the fibers into lotus-root-like multi-pore hollow fibers. The resulting sheet was subjected to steam distillation, to remove the toluene contained in the substrate and then dried by heating at 100° C.

The sheet thus obtained was flexible both at the impregnation layer and coating layer and still had good KOSHI, where the polyurethane had become very porous with uniform pores. In particular, the surface coating layer had a good thickness retention of 49% and smooth. The sheet was tested by exposing for 8 weeks under an atmosphere of 70° C., 95% RH, to show no change of appearance and maintain the smooth surface and good hand. The sheet was also extended or folded at −5° C., but showed almost no change in flexibility, thus proving to be very flexible under a low temperature condition. The coating layer side of the sheet was heat pressed on an embossing roll having a roughened pattern resembling natural leather. It was found that the coating layer side had been provided with the roughened pattern clearly and the sheet showed a flexibility, hand and appearance closely resembling those of natural leather, thus proving to be of large industrial applicability.

COMPARATIVE EXAMPLE 1

A reaction vessel was charged with 500 parts by weight of a polyhexamethylene carbonate diol having a molecular weight (Mn) of 2,000, 500 parts by weight of a polytetramethylene adipate diol having a molecular weight (Mn) of 2,000, 124.1 parts by weight of ethylene glycol, 640.1 parts by weight of diphenylmethane-4,4'-diisocyanate and 5,290 parts by weight of DMF. The mixture was reacted under a nitrogen flow, to give a polyurethane solution (B) having a solid concentration of 25% and a viscosity of 420 poises (30° C.) This polyurethane had no repeating units represented by formula (III) specified in the present invention.

The procedure of Example 1 was followed except that the polyurethane solution (B) was used instead of the polyurethane solution (A), to obtain polyurethane composition liquids (B-1) and (B-2). The same raw nonwoven fabric was impregnated, coated, coagulated and toluene extracted, in the same manner, to give a sheet.

The obtained sheet had a very low thickness retention of the coating layer of 36% and the surface had countless projections and recesses. The pores had very non-uniform sizes. The sheet, including the impregnation layer, had a rather stiff hand and was of low industrial applicability. The sheet was provided with the embossing pattern in the same manner as in Example 1. The embossed sheet, having, irregularly mixed, strongly embossed parts and almost non-embossed parts, could not be said to have an appearance resembling natural leather.

COMPARATIVE EXAMPLE 2

A reaction vessel was charged with 333 parts by weight of a polydiethylene carbonate diol having a molecular weight (Mn) of 2,000, 667 parts by weight of a polytetramethylene adipate diol having a molecular weight (Mn) of 2,000, 124.1 parts by weight of ethylene glycol, 629 parts by weight of diphenylmethane-4,4'-diisocyanate and 5,290 parts by weight of DMF. The mixture was reacted under a nitrogen flow, to give a polyurethane solution (C) having a solid concentration of 25% and a viscosity of 400 poises (30° C.) This polyurethane had no repeating units represented by formula (I) specified in the present invention.

The procedure of Example 1 was followed except that the polyurethane solution (C) was used instead of the polyurethane solution (A), to obtain polyurethane composition liquids (C-1) and (C-2). The same raw nonwoven fabric was impregnated, coated, coagulated and toluene extracted, in the same manner, to give a sheet.

The obtained sheet had a thickness retention of the coating layer of 51% and a smooth surface, with a good hand of both impregnation layer and coating layer. However, when the sheet was exposed for 5 weeks under an atmosphere of 70° C., 95% RH, countless cracks appeared on the surface of the coating layer. The sheet had thus very poor durability and had a big problem as an artificial leather for bags and shoes that require good durability, so that it was of low industrial applicability.

COMPARATIVE EXAMPLE 3

A reaction vessel was charged with 500 parts by weight of a polyhexamethylene carbonate diol having a molecular weight (Mn) of 2,000 as a polymer diol, 500 parts by weight of a polydiethylene adipate diol having a molecular weight (Mn) of 2,000, 124.1 parts by weight of ethylene glycol, 642 parts by weight of diphenylmethane-4,4'-diisocyanate and 5,290 parts by weight of DMF. The mixture was reacted under a nitrogen flow, to give a polyurethane solution (D) having a solid concentration of 25% and a viscosity of 400 poises (30° C.). This polyurethane had no repeating units represented by formula (II) specified by the present invention.

The procedure of Example 1 was followed except that the polyurethane solution (D) was used instead of the polyurethane solution (A), to obtain polyurethane composition liquids (D-1) and (D-2). The same raw nonwoven fabric was impregnated, coated, coagulated and toluene extracted, in the same manner, to give a sheet.

The obtained sheet had a thickness retention of the coating layer of 51% and a smooth surface, with a good hand of both impregnation layer and coating layer. However, the sheet became very poor in flexibility of the impregnation layer and coating layer at −5° C. The sheet thus had a big problem as an artificial leather for bags and shoes that are used under low temperature conditions and required to maintain good flexibility even under such conditions, so that it was of low industrial applicability.

EXAMPLE 2

A reaction vessel was charged with 400 parts by weight of a polyhexamethylene carbonate diol having a molecular weight (Mn) of 2,000, 300 parts by weight of a polydiethylene adipate diol having a molecular weight (Mn) of 2,000 and 200 parts by weight of a polytetramethylene adipate diol having a molecular weight (Mn) of 2,000 as polymer diols, 100 parts by weight of polytetramethylene glycol having a molecular weight (Mn) of 2,000, 138.7 parts by weight of ethylene glycol as a chain extender, 705 parts by weight of diphenylmethane-4,4'-diisocyanate as a diisocyanate and 5,530 parts by weight of DMF as a reaction solvent. The mixture was reacted under a nitrogen flow, to give a polyurethane solution (E) having a solid concentration of 25% and a viscosity of 425 poises (30° C.), and ratios of (I)/{(I)+(II)+(III)}, (II)/{(I)+(II)+(III)} and (III)/{(I)+(II)+(III)} of 0.54, 0.19 and 0.27, respectively.

The following polyurethane composition liquids (E-1) and (E-2) were prepared by using the obtained polyurethane solution (E).

|  | Parts by weight |
| --- | --- |
| Polyurethane composition liquid (E-1) | |
| Polyurethane solution (E) | 560 |
| Sorbitan monostearate | 10.8 |
| Stearyl alcohol | 5.4 |
| DMF | 423.8 |
| Total | 1,000.0 |

|  | Parts by weight |
| --- | --- |
| Polyurethane composition liquid (E-2) | |
| Polyurethane solution (E) | 480 |
| Crison Assistor-SD-14 (Trademark of Dainippon Ink & Chemicals Inc., coagulation adjusting agent) | 5 |
| Titanium oxide | 2.9 |
| DMF | 512.1 |
| Total | 1,000.0 |

Example 1 was repeated except that the polyurethane composition liquids (E-1) and (E-2) were used instead of the polyurethane composition liquids (A-1) and (A-2), respectively, to obtain a sheet. The sheet thus obtained was flexible both at the impregnation layer and coating layer and still had KOSHI, where the polyurethane had become very porous with uniform pores. The surface coating layer had a good thickness retention ratio of 48% and smooth. The sheet was tested by exposing 8 weeks under an atmosphere of 70° C., 95% RH, to show no change of appearance and maintain the smooth surface and good hand. The sheet also showed almost no change in flexibility at −5° C., thus proving to be very flexible under a low temperature condition. The coating layer side of the sheet was heat pressed on an embossing roll having a roughened pattern resembling natural leather. It was found that the coating layer side had been provided with the roughened pattern clearly and the sheet showed a flexibility, hand and appearance closely resembling those of natural leather, thus proving to be of large industrial applicability.

It is understood from this Example that even if the soft segments contain a small amount of repeating units other than those represented by formulas (I), (II) and (III) specified by the present invention, the excellent properties of the present invention are little impaired.

COMPARATIVE EXAMPLE 4

A reaction vessel was charged with 570 parts by weight of a polyhexamethylene carbonate diol having a molecular weight (Mn) of 2,000, 290 parts by weight of a polytetramethylene adipate diol having a molecular weight (Mn) of 2,000, 140 parts by weight of polytetramethylene glycol having a molecular weight (Mn) of 2,000, 138.7 parts by weight of ethylene glycol, 707 parts by weight of diphenylmethane-4,4'-diisocyanate and 5,535 parts by weight of DMF. The mixture was reacted under a nitrogen flow, to give a polyurethane solution (F) having a solid concentration of 25% and a viscosity of 425 poises (30° C.). This polyurethane does not have the repeating units represented by formula (III) specified in the present invention.

Example 2 was repeated except that the polyurethane solution (F) was used instead of the polyurethane solution (E), to obtain polyurethane composition liquids (F-1) and (F-2). Example 2 was further repeated except that the polyurethane composition liquids (F-1) and (F-2) were used instead of the polyurethane composition liquids (E-1) and (E-2), to obtain a sheet. The obtained sheet had a low thickness retention of the coating layer of 33% and the surface had countless projections and recesses. The impregnation layer and surface coating layer of the sheet had a rather stiff hand and the sheet was of low industrial applicability. The sheet was provided with the embossing pattern in the same manner as in Example 1. The embossed sheet, having, irregularly mixed, strongly embossed parts and almost non-embossed parts, could not be said to have an appearance resembling natural leather.

COMPARATIVE EXAMPLE 5

A reaction vessel was charged with 800 parts by weight of a polyhexamethylene carbonate diol having a molecular weight (Mn) of 2,000, 200 parts by weight of a polytetramethylene glycol having a molecular weight (Mn) of 2,000, 138.7 parts by weight of ethylene glycol, 706 parts by weight of diphenylmethane-4,4'-diisocyanate and 5,530 parts by weight of DMF. The mixture was reacted under a nitrogen flow, to give a polyurethane solution (G) having a solid concentration of 25% and a viscosity of 425 poises (30° C.). This polyurethane does not have the repeating units represented by formula (II) and (III) specified in the present invention.

Example 2 was repeated except that the polyurethane solution (G) was used instead of the polyurethane solution (E), to obtain polyurethane composition liquids (G-1) and (G-2). Example 2 was further repeated except that the polyurethane composition liquids (G-1) and (G-2) were used instead of the polyurethane composition liquids (E-1) and (E-2), to obtain a sheet. The obtained sheet had a low thickness retention of the coating layer of 31% and stiff and the surface had countless projections and recesses. The impregnation layer was also stiff and the sheet was of low industrial applicability.

EXAMPLE 3

A reaction vessel was charged with 400 parts by weight of a polyhexamethylene carbonate diol having a molecular weight (Mn) of 2,000, 250 parts by weight of a polydipropylene adipate diol having a molecular weight (Mn) of 2,000 and 350 parts by weight of a polybutylene adipate diol having a molecular weight (Mn) of 2,000 as polymer diols, 124.1 parts by weight of ethylene glycol as a chain extender, 640 parts by weight of diphenylmethane-4,4,-diisocyanate as a diisocyanate and 5,290 parts by weight of DMF as a reaction solvent. The mixture was reacted under a nitrogen flow, to give a polyurethane solution (H) having a solid concentration of 25% and a viscosity of 400 poises (30° C.), and ratios of (I)/{(I)+(II)+(III)}, (II)/{(I)+(II)+(III)} and (III)/{(I)+(II)+(III)} of 0.5, 0.32 and 0.18, respectively.

The following polyurethane composition liquids (H-1) and (H-2) were prepared by using the obtained polyurethane solution (H).

| | Parts by weight |
|---|---|
| Polyurethane composition liquid (H-1) | |
| Polyurethane solution (H) | 720 |
| Sorbitan monostearate | 10.8 |
| Stearyl alcohol | 5.4 |
| Black pigment | 2.0 |
| DMF | 261.8 |
| Total | 1,000.0 |
| Polyurethane composition liquid (H-2) | |
| Polyurethane solution (H) | 480 |
| Crison Assistor-SD-14 (Trademark of Dainippon Ink & Chemicals Inc., coagulation adjusting agent) | 5 |
| DMF | 513 |
| Total | 1,000 |

Islands-in-the-sea type polymer-blend spun filaments having a sea component of polyethylene and an islands component of nylon-6 in a ratio by weight of 50/50 were obtained by melt spinning. The filaments were wet heat drawn, crimped and cut to give fibers having a length of 51 mm and a fineness of 3.5 denier (the average fineness of islands component was 0.003 denier and the number of islands in the fiber cross-section was 600). The fibers were formed into a web, which was then laminated and needle-punched to give an entangled nonwoven fabric having a weight of 640 g/ml and a thickness of 2.0 mm. The nonwoven fabric thus obtained was impregnated with 2.2 times its weight of the polyurethane composition liquid (H-1) and the surface was made smooth. Next, the polyurethane composition liquid (H-2) was applied on the surface in an amount of 80 g/m² and then the nonwoven fabric with the liquids were immersed in a 40% by weight aqueous DMF solution at 45° C. for 30 minutes, to coagulate both impregnated layer and coating layer.

The obtained sheet was immersed in toluene at 80° C., and the polyethylene present in the nylon-6/polyethylene polymer-blend spun fibers used for the raw nonwoven fabric was extracted off. The resulting sheet was subjected to steam distillation, to remove the toluene contained in the substrate and then dried by heating at 100° C.

The sheet thus obtained had a good thickness retention of the coating layer of 48%. The impregnation layer and coating layer were both flexible and had good KOSHI. The coating layer had a smooth surface. The sheet was tested by exposing for 8 weeks under an atmosphere of 70° C., 95% RH, to show no change of appearance and maintain the smooth surface and good hand. The sheet also showed almost no change in flexibility at low temperature, thus proving to be very flexible under a low temperature condition. The sheet also had good embossability and was of large industrial applicability as an artificial leather.

COMPARATIVE EXAMPLE 6

A reaction vessel was charged with 500 parts by weight of a polyhexamethylene carbonate diol having a molecular weight (Mn) of 2,000, 500 parts by weight of a polyethylene glycol having a molecular weight (Mn) of 2,000, 124.1 parts by weight of ethylene glycol, 641.2 parts by weight of diphenylmethane-4,4'-diisocyanate and 5,290 parts by weight of DMF. The mixture was reacted under a nitrogen flow, to give a polyurethane solution (K) having a solid concentration of 25% and a viscosity of 420 poises (30° C.). This polyurethane had no repeating units represented by formulas (II) and (III) specified in the present invention.

The procedure of Example 1 was followed except that the polyurethane solution (K) was used instead of the polyurethane solution (A), to obtain polyurethane composition liquids (K-1) and (K-2). The same raw nonwoven fabric was impregnated, coated, coagulated and toluene extracted, in the same manner, to give a sheet.

The obtained sheet had a low thickness retention of the coating layer of 36% and the surface had countless projections and recesses. The sheet, including the impregnation layer, had a rather stiff hand and had very poor embossability, thus being of low industrial applicability.

EXAMPLE 4

There were used hexanediol, butanediol, diethylene glycol, adipic acid and dimethyl carbonate to produce a copolyester diol having a molecular weight (Mn) of 2,000 and in which hexane diol residues, butanediol residues and diethylene glycol residues occupied 49.0 mole %, 20.3 mole % and 30.7 mole %, respectively, of all diol residues; and 33.8% and 66.2% of hexanediol residues bonded to adipic acid residues and dimethyl carbonate residues respectively, 49.7% and 50.3% of butanediol residues bonded to adipic acid residues and dimethyl carbonate residues respectively and 63.0% and 37.0% of diethylene glycol residues bonded to adipic acid residues and dimethyl carbonate residues respectively.

A reaction vessel was charged with 1,000 parts by weight of the copolyester diol thus obtained, 124.1 parts by weight of ethylene glycol, 638.7 parts by weight of diphenylmethane-4,4'-diisocyanate and 5,290 parts by weight of DMF. The mixture was reacted under a nitrogen flow, to give a polyurethane solution (L) having a solid concentration of 25% and a viscosity of 403 poises (30° C.), and ratios of (I)/{(I)+(II)+(III)}, (II)/{(I)+(II)+(III)}, (III)/{(I)+(II)+(III)} and {(IV)+(V)}/{(II)+(III)+(IV)+(V)} of 0.49, 0.14, 0.37 and 0.44, respectively.

Example 1 was repeated except that the polyurethane solution (L) was used instead of the polyurethane solution (A), to polyurethane composition liquids (L-1) and (L-2). The same raw nonwoven fabric was impregnated and coated with these liquids, coagulated and toluene extracted, to give a sheet.

The sheet thus obtained had a very good thickness retention of coating layer of 55% and had, including the impregnation layer, an excellent flexibility and good hand with KOSHI. The coating layer had a smooth surface. The sheet was tested by exposing for 8 weeks under an atmosphere of 70° C., 95% PH, to show no change of appearance and maintain the excellent smooth surface and good hand. The sheet also showed almost no change in flexibility at low temperature, thus proving to be very flexible under a low temperature condition. The sheet also had an excellent embossability and the highest-quality feeling among the artificial leathers obtained in the above Examples, thus proving to be of very large industrial applicability.

EXAMPLE 5

A reaction vessel was charged with 1,000 parts by weight of polyhexamethylene carbonate diol having a molecular weight (Mn) of 2,000, 124.1 parts by weight of ethylene glycol, 634 parts by weight of diphenylmethane-4,4'-diisocyanate and 5,270 parts by weight of DMF. The mixture was reacted under a nitrogen flow, to give a polyurethane solution (M-I) having a solid concentration of 25% and a viscosity of 410 poises (30° C.). Separately, in the same manner, a polyurethane solution (M-2) having a solid concentration of 25% by weight and a viscosity of 400 poises was obtained from 1,000 parts by weight of polytetramethylene adipate diol having a molecular weight (Mn) of 2,000, 124.1 parts by weight of ethylene glycol, 634 parts by weight of diphenylmethane-4,4'-diisocyanate and 5,270 parts by weight of DMF. Also a polyurethane solution (M-3) having a solid concentration of 25% and a viscosity of 390 poises (30° C.) was obtained from 1,000 parts by weight of polydiethylene adipate diol having a molecular weight (Mn) of 2,000, 124.1 parts by weight of ethylene glycol, 634 parts by weight of diphenylmethane-4,4'-diisocyanate and 5,270 parts by weight of DMF. These polyurethane solutions (M-1), (M-2) and (M-3) were mixed in a ratio by weight of 4:3:3, to give a mixed polyurethane solution (M). The polyurethane constituting the mixed polyurethane solution had ratios of (I)/{(I)+(II)+(III)}, (II)/{(I)+(II)+(III)} and (III)/{(I)+(II)+(III)} of 0.49, 0.26 and 0.25, respectively.

There were mixed 480 parts by weight of the polyurethane solution (M), 5 parts by weight of Crisbon Assistor SD-14 and 91 parts by weight of DMF. The mixture was cast on a polyethylene film to a thickness of 1.0 mm and the film with the liquid was immersed in a coagulating bath containing DMF/water=30/70 (by weight) at 40° C. and then washed in a water bath at 40° C. for 6 hours to remove DMF completely, to give a porous sheet. The sheet thus obtained had a thickness and density of 0.44 mm and 0.45 g/cm$^3$, respectively, and a good thickness retention of 44%. The sheet was tested by exposing for 8 weeks under an atmosphere of 70° C., 95% RH, to show no change of appearance and maintain the smooth surface and good hand. The sheet also showed almost no change in flexibility at low temperature, thus proving to be very flexible under a low temperature condition. The sheet was patched onto an entangled nonwoven fabric having a thickness of 1.2 mm formed of ultrafine nylon fibers having a fineness of 0.01 denier and the surface was embossed, with good embossability. Although the obtained artificial leather had a sufficient industrial applicability, it was rather inferior on all properties to those obtained in Examples 1 through 4.

EXAMPLE 6

Example 1 was repeated except that 180 parts by weight of 1,4-butanediol was used as chain extender instead of 124.1 parts by weight of ethylene glycol, to obtain an artificial leather. The artificial leather showed a little different hand as compared to that of Example 1, but almost no difference therefrom with respect to properties other than hand, thus proving to be of high industrial applicability.

EXAMPLE 7

Example 5 was repeated except that the polyurethane solution (L) obtained in Example 4 was used, to obtain a porous sheet. The sheet had a thickness and density of 0.51 mm and 0.40 g/cm$^3$, respectively, and a good thickness retention of 51%. The sheet also had good flexibility and smoothness. The sheet was tested by exposing for 8 weeks under an atmosphere of 70° C., 95% RH, to show no change of appearance. The sheet also showed good flexibility under a low temperature condition.

EXAMPLE 8

Example 5 was repeated except that the polyurethane solution (A) obtained in Example 1 was used, to obtain a porous sheet. The sheet had a thickness and density of 0.48 mm and 0.42 g/cm$^3$, respectively, and a thickness retention of 48%. The sheet also had good flexibility and smoothness. The sheet was tested by exposing for 8 weeks under an atmosphere of 70° C., 95% RH, to show no change of appearance. The sheet also showed good flexibility under a low temperature condition.

Obviously, numerous modification and variations of the present invention are possible in light of the above teachings. It is therefore to be understood that within the scope of the appended claims, the invention may be practiced otherwise than as specifically described herein.

This application is based on Japanese Patent Application JP 6-50524, filed in the Japanese Patent Office on Mar. 22, 1994, the entire contents of which are hereby incorporated by reference.

What is claimed as new and desired to be secured by Letters Patent of the United States is:

1. A porous sheet produced by a process comprising the steps of:

i) impregnating and/or coating a synthetic fibrous substrate structure with a solution of a polyurethane comprising:

a) a soft segment component containing in the same or different soft segments repeating units represented by formula (I), formula (II) and formula (III), $$—O—R_1—O—CO—O— \quad (I)$$

$$—O—R_2—O—CO—R_3—CO— \quad (II)$$

$$—(O—CH_2—CHR_5)_2—O—CO—R_4—CO— \quad (III)$$

wherein $R_1$ is a hydrocarbon group having 5 to 6 carbon atoms, $R_2$ is a tetramethylene group, $R_3$ and $R_4$, are each independently an alkylene group having 4 to 8 carbon atoms and $R_5$ is a hydrogen atom or methyl group, the ratio between the number of repeating units (I), (II) and (III) and the total number of repeating units (I), (II) and (III) are 0.1 to 0.8, 0.05 to 0.7 and 0.05 to 0.8, respectively, and b) a hard segment component derived from an aromatic diisocyanate component and ethylene glycol or 1,4-butanediol component; and ii) wet coagulating said solution.

2. The porous sheet of claim 1, wherein said porous sheet has a thickness after slicing of 0.2 to 3 mm.

* * * * *